Patented Feb. 19, 1946

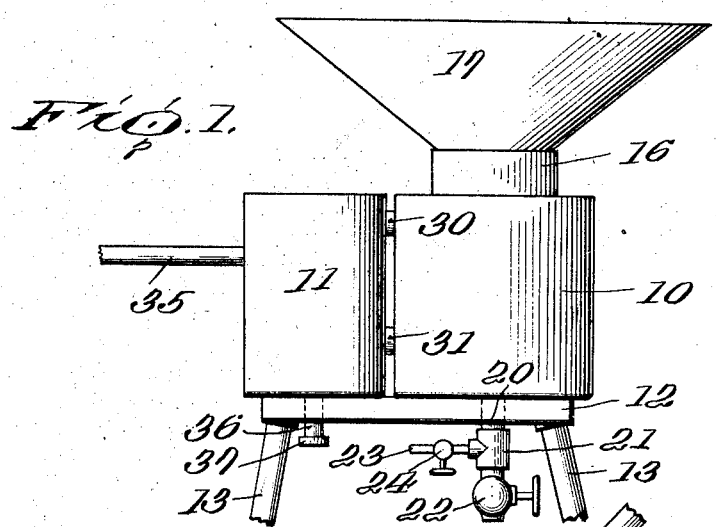
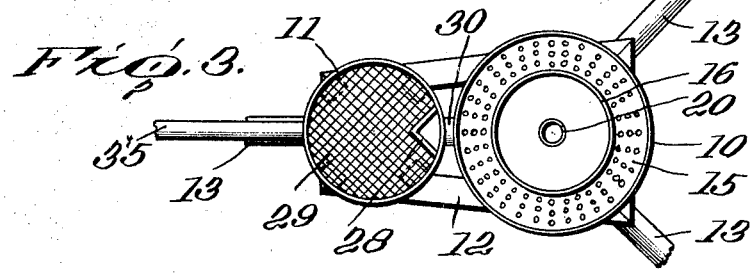
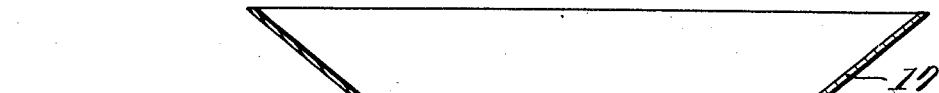

2,395,258

UNITED STATES PATENT OFFICE 2,395,258

SALT DISSOLVING APPARATUS

John Calvin Drake, New Orleans, La., assignor to Myles Salt Company, Limited, New Orleans, La., a corporation of Louisiana Application August 6, 1942, Serial No. 453,868

3 Claims. (Cl. 23—272)

This invention relates to a salt dissolving apparatus comprising the structures for introducing the salt and water, and for removing and purifying the brine.

A feature of the invention is the provision of a simple and compact apparatus, having its parts formed of simple component elements and assembled as a strong and rigid whole.

Another feature of the apparatus is the provision of mechanically assembled structures which can be readily shipped and moved without difficulty.

With these and other features as objects in view, an illustrative form of practicing the invention is set forth on the accompanying drawing, in which:

Figure 1 is a side elevation of the apparatus.

Figure 2 is an upright sectional view of the same.

Figure 3 is a top plan view of the same, with the hopper removed.

In the drawing, the apparatus is illustrated as comprised of a dissolving vessel 10 and a filtering vessel 11 which are mounted at the same level upon a stand comprised of top frame members 12, mounted on legs 13.

The dissolving vessel 10 is provided near its top with a perforated wall 15 which extends inwardly and upwardly and joins an upstanding cylindrical wall 16 which likewise has perforations for the portion thereof located below the level of the top of the dissolving vessel 10. The walls 15, 16 form a peripheral trough within the upper portion of the dissolving vessel 10.

A hopper 17 having a cylindrical discharge spout 18 at its lower end is mounted on the dissolving vessel by introducing the spout within the wall 16.

A pipe connection 20 leads from the bottom of the dissolving vessel 10 through a T connection 21 to a gate valve 22. From the T connection 21 a lateral supply pipe 23 leads through a valve 24 to a water supply.

The filtering vessel 11 has a channel provided by welding a metal angle member 28 inside the wall thereof, thus providing an upright passageway within the filtering vessel 11 and opening thereinto at its lower end, at a point above the bottom wall of the filtering vessel 11. This angle member 28 is illustrated as a simple angle iron having legs of equal widths, and it is preferred to extend this member to the level of the top of the filtering vessel 11. A screen 29 is secured within the filtering vessel 11 for receiving gravel as a filtering element.

The vessels 10, 11 are mechanically joined together by welded connections 30, 31, which may be lengths of metal pipe. The upper connection 30 is located above the level of the plate 15, and the walls of the vessels 10, 11 are cut away so that a port is thereby provided by which the brine can flow from the trough formed by the walls 15, 16 within the vessel 10 into the passageway provided by the angle member 28. The lower connection 31 is blind, and the two vessels are shut off from one another except for the port in the connection 30.

A discharge pipe 35 leads from the filtering vessel 11 at a level below that of the trough. The bottom wall of the filtering vessel 11 is provided with a simple pipe connection 36 which is normally closed by a cap 37.

In service, the device is erected by placing the assembled vessels upon the stand, and mounting the hopper in position. Salt is placed in the hopper, and flows downwardly within the space provided by the inner trough wall 16 into the dissolving vessel 10. Valve 22 is closed and valve 24 is now opened so that water flows upwardly through the salt and effects dissolution thereof, and the brine flows off through the perforations in the plates 15, 16 into the trough and thence through the ports 30 and into the passageway 28. As the two vessels are at the same level, there is no difficulty of overflowing, as the perforations strain off any large particles in the coarse salt which might clog any of the orifices later encountered. The brine flows downward through the passageway within the angle member 28 to the chamber 40 of the filtering vessel 11, this chamber being located below the screen 29. The brine then flows upwardly through the screen and through the filter bed 41 and ultimately flows out through the discharge 35, smaller particles being thus eliminated in the filter bed so that a clear brine is delivered.

During the course of operation, heavy impurities of the salt remain within the dissolving vessel 10 and accumulate on the bottom thereof, and any heavy impurities carried over through the port in the connection 30 likewise accumulate in the bottom of the filter vessel 11. From time to time, the supply of salt is terminated, and when dissolution has been accomplished, the liquid is withdrawn, after closing the water supply valve 24. The residue of liquid and aforesaid settlings can then be discharged from the vessels by opening the gate valve 22 and removing the pipe cap 37 and flushing the vessels with water to remove the deposits. At this time, also, the gravel filter may be exchanged, or may be cleansed by agitation and a downward flow of water therethrough.

After cleaning the system, the pipe cap 37 and the gate valve 22 are closed, and thereupon further quantities of salt may be dissolved as described above.

It is obvious that the invention is not limited solely to the illustrative form of construction shown, but may be practiced in many ways within the scope of the appended claims.

I claim:

1. A salt dissolving apparatus comprising a dissolving vessel provided with an inner peripheral trough at its upper end, said trough having an inner perforated wall, said perforated wall forming an opening in the upper portion of said dissolving vessel, an inlet to the bottom portion of said vessel, a filtering vessel located at the level of and adjacent the dissolving vessel, a conduit member forming a vertical passageway within said filtering vessel, a discharge conduit leading from said trough into said passageway at a high level thereof, said passageway having an opening into the filtering vessel at a low level thereof, a filter means positioned in the filtering vessel above said low level opening from said passageway, and a discharge means from the filtering vessel above the level of the filter means and below the top of the trough.

2. Apparatus in accordance with claim 1 which includes a hopper supported by the dissolving vessel the delivery end of said hopper being in direct communication with the opening formed by the inner perforated wall of the trough in the upper portion of said dissolving vessel.

3. A salt dissolving apparatus comprising a dissolving vessel provided with an inner peripheral trough at its upper end, said trough having an inner perforated wall, a hopper supported by the dissolving vessel, the delivery end of said hopper extending into the dissolving vessel within the inner peripheral wall of the trough, an inlet to the bottom portion of said dissolving vessel, a filtering vessel located at the level of and adjacent the dissolving vessel, an angle member sealed to the wall of the filtering vessel so as to provide a vertical passageway, a discharge conduit leading from said trough into said passageway at a high level thereof, said passageway having an opening into the filtering vessel at a low level thereof, a filter means positioned in the filtering vessel above said low level opening from said passageway and discharge means from the filtering vessel above the level of the filter means and below the top of the trough.

JOHN CALVIN DRAKE.